US012724655B2

(12) United States Patent
Hahn et al.

(10) Patent No.: US 12,724,655 B2
(45) Date of Patent: Sep. 1, 2026

(54) HOST CONTROLLED MITIGATION OF PANIC SITUATION

(71) Applicant: Sandisk Technologies, Inc., Milpitas, CA (US)

(72) Inventors: Judah Gamliel Hahn, Ofra (IL); Ariel Navon, Revava (IL); Shay Benisty, Beer Sheva (IL); Alexander Bazarsky, Holon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/819,515

(22) Filed: Aug. 29, 2024

(65) Prior Publication Data

US 2026/0093568 A1 Apr. 2, 2026

(51) Int. Cl.

*G06F 11/00* (2006.01)
*G06F 3/06* (2006.01)
*G06F 11/20* (2006.01)

(52) U.S. Cl.

CPC .......... *G06F 11/004* (2013.01); *G06F 3/0617* (2013.01); *G06F 3/0659* (2013.01); (Continued)

(58) Field of Classification Search

CPC .. G06F 11/004; G06F 11/008; G06F 11/0751; G06F 11/079; G06F 11/0793; (Continued)

(56) References Cited

U.S. PATENT DOCUMENTS 6,487,677 B1 * 11/2002 Jantz .................. G06F 11/0793 714/48
9,111,583 B2 8/2015 Trantham
(Continued)

FOREIGN PATENT DOCUMENTS

JP H1078854 A 3/1998
JP H1185410 A 3/1999
(Continued)

OTHER PUBLICATIONS

Open Compute Project, Datacenter NVMe® SSD Specification (Version 2.0).

*Primary Examiner* — Marc Duncan
*Assistant Examiner* — Albert Li
(74) *Attorney, Agent, or Firm* — Patterson + Sheridan, LLP

(57) ABSTRACT

By detecting panic situations and providing a host device detailed panic data and mitigation options before the panic situation condition occurs, failure of data storage devices may be reduced. Several mitigation options may be presented to the host device upon detection of a future panic situation, such as adjusting read performance; increasing device power; performing evacuation and management operations; and/or redirecting host commands to another data storage device for command completion. When the other data storage device is in the same PCIe tree and reachable, the command may be directed with PRPs/SGLs that point back to the same host device. In some embodiments, the data storage devices may have a submission queue between them. In some embodiments, the data storage device comprises a panic early detection module and a panic control module.

19 Claims, 8 Drawing Sheets

(52) U.S. Cl.
CPC ........ *G06F 3/0688* (2013.01); *G06F 11/2094* (2013.01); *G06F 2201/805* (2013.01)

(58) Field of Classification Search
CPC ........... G06F 11/2094; G06F 2201/805; G06F 3/0614; G06F 3/0616; G06F 3/0617; G06F 3/0659
See application file for complete search history.

(56) References Cited

U.S. PATENT DOCUMENTS 10,372,558 B2 8/2019 Park et al.
11,538,539 B2 12/2022 Sarkar et al.
11,567,670 B2 1/2023 Elyasi et al.
2005/0283655 A1* 12/2005 Ashmore ............ G06F 11/1092 714/6.32
2006/0282709 A1* 12/2006 Shu .................... G06F 11/3485 714/100
2007/0174720 A1* 7/2007 Kubo ................... G06F 11/008 714/42
2008/0250042 A1* 10/2008 Mopur ................. G06F 11/008
2009/0271657 A1* 10/2009 McCombs ............ G06F 11/004 714/E11.09
2014/0281316 A1* 9/2014 Sano .................. G06F 11/1451 714/6.2
2017/0207964 A1* 7/2017 Ragupathi ........... H04L 41/0668
2019/0034306 A1* 1/2019 Wysocki ............. G06F 11/2094
2019/0065382 A1* 2/2019 Velayuthaperumal ....................... G06F 3/065
2019/0391890 A1* 12/2019 Swamy ............... G06F 11/2089
2022/0327018 A1 10/2022 Ilic
2024/0053923 A1 2/2024 Benisty et al.
2025/0085878 A1* 3/2025 Ji ........................... G06F 3/064
2025/0147903 A1* 5/2025 Jones .................... G06F 3/0659

FOREIGN PATENT DOCUMENTS

JP 2006059119 A 3/2006
JP 2007280554 A 10/2007
JP 2008112276 A 5/2008
JP 2009187254 A 8/2009
JP 2012073825 A 4/2012
JP 2023137307 A 9/2023
WO 2015121912 A1 8/2015

* cited by examiner

200

<table>
<tr><th>REQUIREMENT ID</th><th>BYTE ADDRESS</th><th>FIELD</th><th># OF BYTES</th><th>FIELD DESCRIPTION</th></tr>
<tr><td>EREC-2</td><td>2</td><td>PANIC RESET ACTION</td><td>1</td><td>BIT FIELD INDICATING POTENTIAL RESET ACTIONS THAT MAY NEED TO BE TAKEN. IF NO RESET ACTION NEEDED, DO NOT SET ANY OF THE BITS. MORE THAN 1 BIT CAN BE SET, AND IT IS UP TO THE HOST TO DECIDE THE SEQUENCE OF ACTION(S) TO TAKE. USE BIT 0 IF POSSIBLE. IF BIT 0 IS NOT POSSIBLE USE BIT 1, ETC.
<table>
<tr><th>BIT</th><th>DESCRIPTION</th></tr>
<tr><td>7:6</td><td>RESERVED. SHALL BE CLEARED TO ZERO.</td></tr>
<tr><td>5</td><td>PCIE CONVENTIONAL HOT RESET.</td></tr>
<tr><td>4</td><td>MAIN POWER CYCLE.</td></tr>
<tr><td>3</td><td>PERST#</td></tr>
<tr><td>2</td><td>PCIE FUNCTION LEVEL RESET.</td></tr>
<tr><td>1</td><td>NVM SUBSYSTEM RESET.</td></tr>
<tr><td>0</td><td>NVME CONTROLLER RESET.</td></tr>
</table></td></tr>
<tr><td>EREC-3</td><td>3</td><td>DEVICE RECOVERY ACTION 1</td><td>1</td><td>THE RECOVERY ACTION TO TAKE FOR HANDLING A DEVICE PANIC CONDITION. VALUE IS DEPENDENT ON THE PANIC CONDITION. USE 01H IF POSSIBLE.
<table>
<tr><th>BIT</th><th>DESCRIPTION</th></tr>
<tr><td>7:6</td><td>RESERVED. SHALL BE CLEARED TO ZERO.</td></tr>
<tr><td>5</td><td>SANITIZE REQUIRED.</td></tr>
<tr><td>4</td><td>DEVICE REPLACEMENT REQUIRED.</td></tr>
<tr><td>3</td><td>VENDOR ANALYSIS REQUIRED.</td></tr>
<tr><td>2</td><td>VENDOR SPECIFIC COMMAND REQUIRED.</td></tr>
<tr><td>1</td><td>FORMAT NVM REQUIRED (ANY SES VALUE, ANY SUPPORTED COMBINATION OF OTHER PARAMETERS - PIL, PI, MSET, IBAF).</td></tr>
<tr><td>0</td><td>NO ACTION REQUIRED.</td></tr>
</table></td></tr>
</table>

| REQUIREMENT ID | BYTE ADDRESS | FIELD | # OF BYTES | FIELD DESCRIPTION |
|---|---|---|---|---|
| ERRIE-3 | 3:2 | Error Injection Type | 2 | Error Injection type definition: |

| Value | Field Description |
|---|---|
| 0000h | Reserved. |
| 0001h | Device Panic - CPU/Controller Hang |
| 0002h | Device Panic - NAND Hang |
| 0003h | Device Panic - PLP Defect |
| 0004h | Device Panic - Logical Firmware Error |
| 0005h | Device Panic - DRAM Corruption Critical Path |
| 0006h | Device Panic - DRAM Corruption Non-Critical Path |
| 0007h | Device Panic - NAND Corruption |
| 0008h | Device Panic - SRAM Corruption |
| 0009h | Device Panic - HW Malfunction |
| 000Ah | Device Panic - No More NAND Spares Available |
| 000Bh - FFFFh | Reserved. Shall be cleared to zero. |

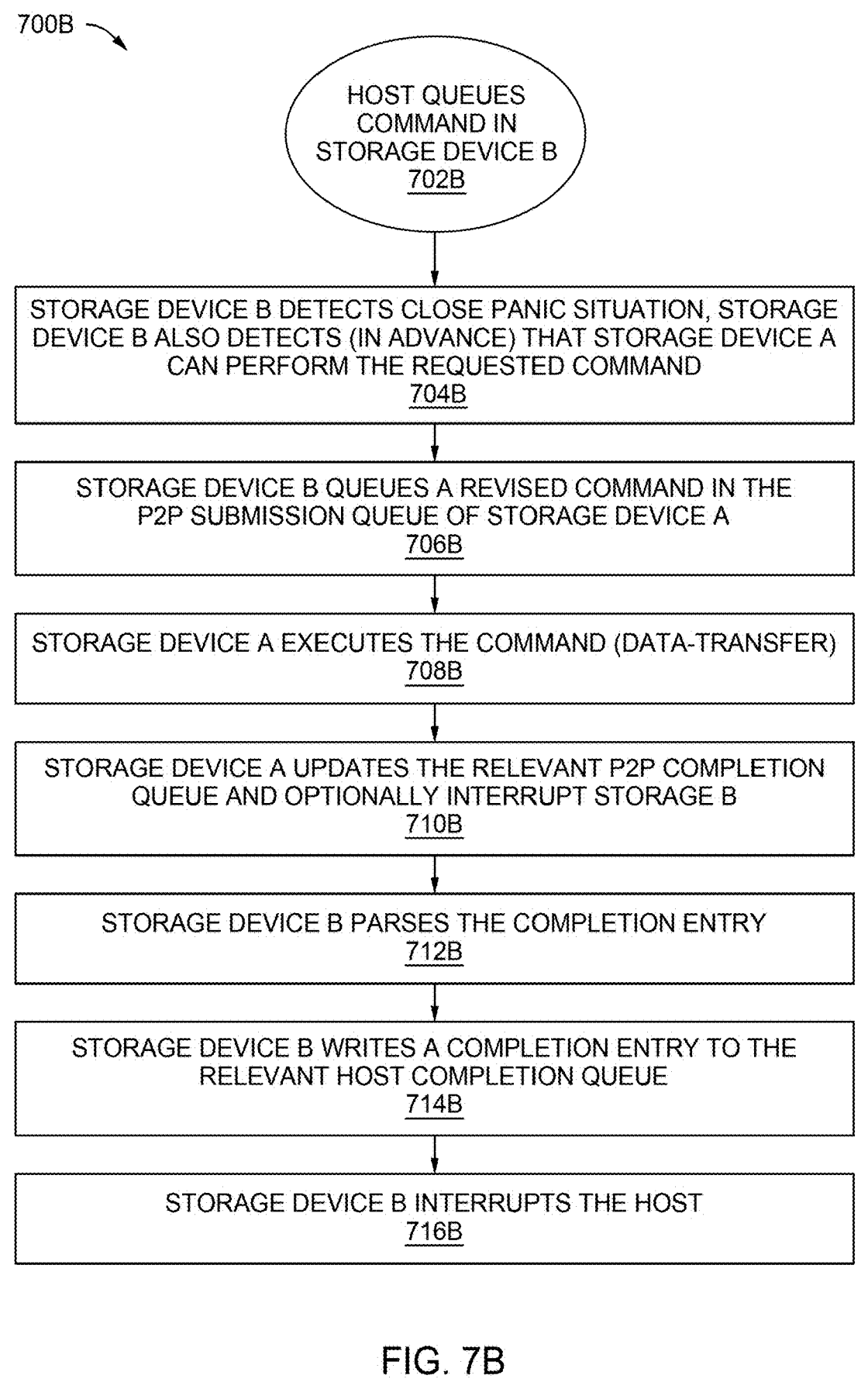

HOST QUEUES COMMAND IN STORAGE DEVICE B
702B

STORAGE DEVICE B DETECTS CLOSE PANIC SITUATION, STORAGE DEVICE B ALSO DETECTS (IN ADVANCE) THAT STORAGE DEVICE A CAN PERFORM THE REQUESTED COMMAND
704B

STORAGE DEVICE B QUEUES A REVISED COMMAND IN THE P2P SUBMISSION QUEUE OF STORAGE DEVICE A
706B

STORAGE DEVICE A EXECUTES THE COMMAND (DATA-TRANSFER)
708B

STORAGE DEVICE A UPDATES THE RELEVANT P2P COMPLETION QUEUE AND OPTIONALLY INTERRUPT STORAGE B
710B

STORAGE DEVICE B PARSES THE COMPLETION ENTRY
712B

STORAGE DEVICE B WRITES A COMPLETION ENTRY TO THE RELEVANT HOST COMPLETION QUEUE
714B

STORAGE DEVICE B INTERRUPTS THE HOST
716B

FIG. 7B

HOST CONTROLLED MITIGATION OF PANIC SITUATION

BACKGROUND OF THE DISCLOSURE

Field of the Disclosure

Embodiments of the present disclosure generally relate to a data storage device for early detection and mitigation of panic situations.

Description of the Related Art

Device panic situation or panic situation are circumstances in which a data storage device (e.g., a solid state drive (SSD)) can notify a host device of mitigation steps to take when a panic condition (e.g., a failure) occurs. The panic condition may be signaled using an asynchronous event or a Controller Failure Status register. Once a panic condition, such as a failure, occurs, a reset action can be performed by the host device. After a host device performs mitigation steps corresponding to the identified panic condition, the storage device is expected to provide diagnostic information. In some circumstances, the data storage device may also suggest post (potential) reset actions that should be taken.

When a data storage device detects a panic situation, panic situation is reported to the host device through an interface and the data storage device's capabilities during the panic situation are provided to the host device. However, currently, there are no requirements or methods for a data storage device to prepare in advance for a future panic situation before the actual panic situation occurs.

Thus, there is a need the art for an improved data storage device for early detection and mitigation of panic situations.

SUMMARY OF THE DISCLOSURE

By detecting panic situations and providing a host device detailed panic data and mitigation options before the panic situation condition occurs, failure of data storage devices may be reduced. Several mitigation options may be presented to the host device upon detection of a future panic situation, such as adjusting read performance; increasing device power; performing evacuation and management operations; and/or redirecting host commands to another data storage device for command completion. When the other data storage device is in the same PCIe tree and reachable, the command may be directed with PRPs/SGLs that point back to the same host device. In some embodiments, the data storage devices may have a submission queue between them. In some embodiments, the data storage device comprises a panic early detection module and a panic control module.

In one embodiment, a data storage device includes a memory device; and a controller coupled to the memory device, wherein the controller is configured to: detect a future panic situation of the data storage device; analyze the future panic situation; suggest at least one mitigation option to a host device, wherein the suggestion comprises a decision timeout; perform a default mitigation option while waiting to receive the selected mitigation option from the host device; receive from the host device a selected mitigation option selected from the suggested at least one mitigation options; and perform the selected mitigation option.

In another embodiment, a data storage device includes a memory device; and a controller coupled to the memory device, wherein the controller is configured to: detect a future panic situation of the data storage device based on a panic indicator; analyze the future panic situation; suggest at least one mitigation option to a host device, wherein a mitigation option of the at least one mitigation options comprises redirecting a host command to another location; perform a mitigation option; and determine that the future panic situation is resolved.

In yet another embodiment, a data storage device includes means to store data; and a controller coupled to the means to store data, wherein the controller is configured to: detect a future panic situation of the data storage device; receive a host command queued in a submission queue of a host device; redirect the host command to a second data storage device for completion, wherein the second data storage device is in a same PCIe tree as the data storage device; and interrupt the host with a completion entry to a relevant host completion queue of the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a table illustrating various panic reset and recovery actions of a data storage device, according to some embodiments.

FIG. 4 is a table illustrating various potential error injections types for debugging panic situations of a data storage device, according to some embodiments.

FIG. 7B is a flowchart illustrating a method of panic situation detection and mitigation of the storage device of FIG. 7A.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments.

Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

By detecting panic situations and providing a host device detailed panic data and mitigation options before the panic situation condition occurs, failure of data storage devices may be reduced. Several mitigation options may be presented to the host device upon detection of a future panic situation, such as adjusting read performance; increasing device power; performing evacuation and management operations; and/or redirecting host commands to another data storage device for command completion. When the other data storage device is in the same PCIe tree and reachable, the command may be directed with PRPs/SGLs that point back to the same host device. In some embodiments, the data storage devices may have a submission queue between them. In some embodiments, the data storage device comprises a panic early detection module and a panic control module.

Figure 1:
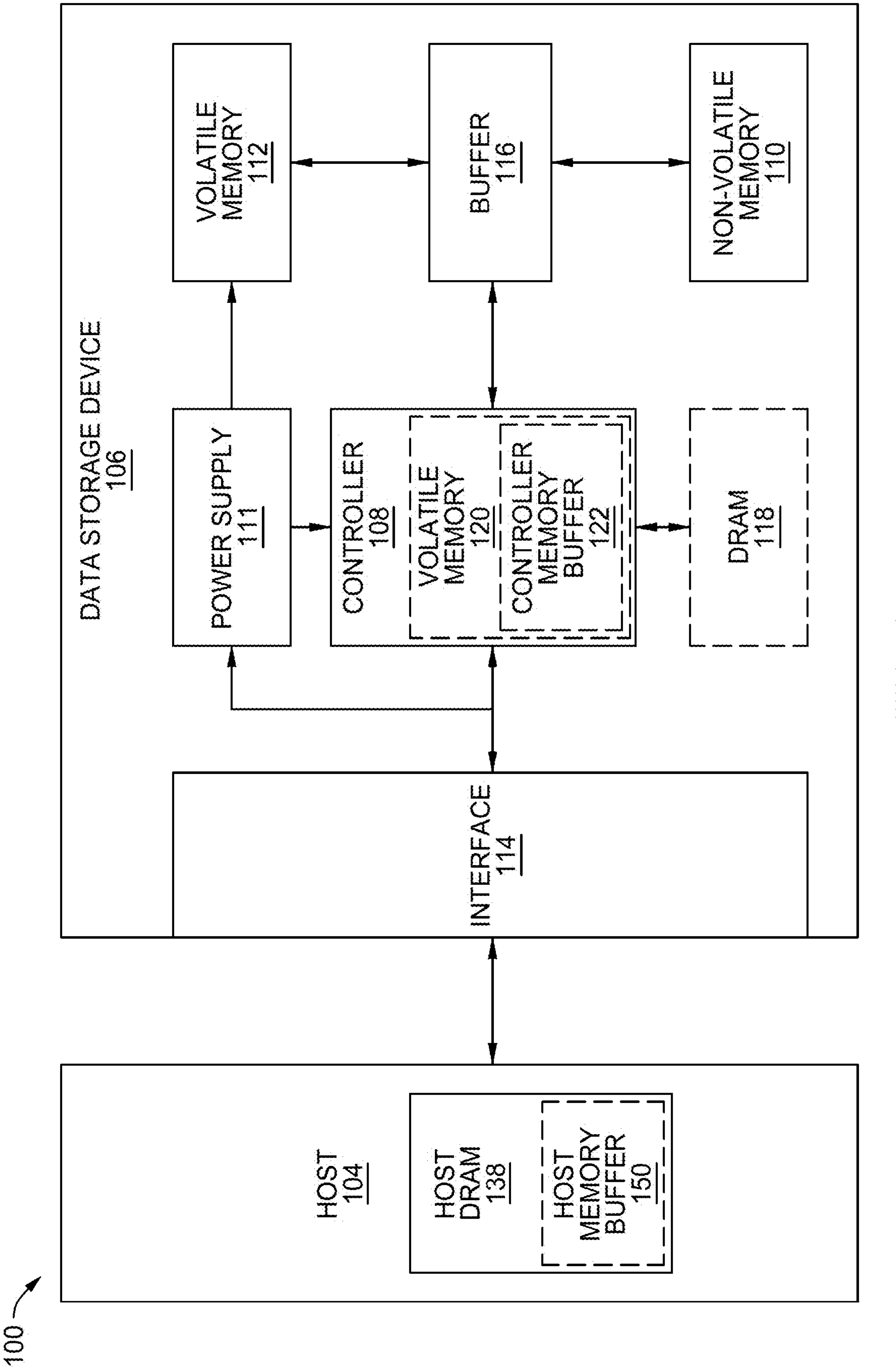
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with non-volatile memory express (NVMe) protocol or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Controller 108 may include circuitry or processors configured to execute programs for operating the data storage device 106.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

FIG. 2 is a table 200 illustrating various panic reset and recovery actions of a data storage device, according to some embodiments. Table 200 is taken from the publicly available Open Compute Project (OCP) Datacenter Specification, titled Datacenter NVMe® SSD Specification (Version 2.0). A data storage device may use a bit field to indicate potential reset actions that may need to be taken during or before to prevent a panic situation. A data storage device may also use a bit field to indicate an appropriate device recovery action to take for handling a panic situation (e.g., device panic condition or panic mode). As will be discussed below, by providing additional mitigation options and detailed panic data to the host device before the device panic condition occurs (when possible) and providing the host device with a set of recovery/mitigation options to handle the device panic condition, the probability of device failure may be reduced. The set of mitigation options may include modifying a subset of different device capabilities, such as: reducing performance, increasing drawn power, removing the option to read from a subset of the dies, or even redirecting host commands to another available storage device. In some embodiments, such a storage system will analyze the current situation due to inputs regarding the storage device's health and external conditions, as well as output an indication of the potential panic condition to the host using a log page or other suitable means for signaling.

In some embodiments, when providing the host device with a set of recovery/mitigation options to handle the device panic condition, the data storage device may have reduced device capabilities for the duration of the device panic situation. It should be noted that while the error recovery log is designed for datacenter storage devices (e.g., enterprise storage devices), the log could also be adapted in client SSDs. The disclosed embodiments are applicable to both types of SSDs, datacenter storage devices and client SSDs, although certain features may vary. For example, capacitor or DRAM failures may not be applicable in the client SSDs, but HMB failures can occur in client but not in datacenter devices.

Figure 3:
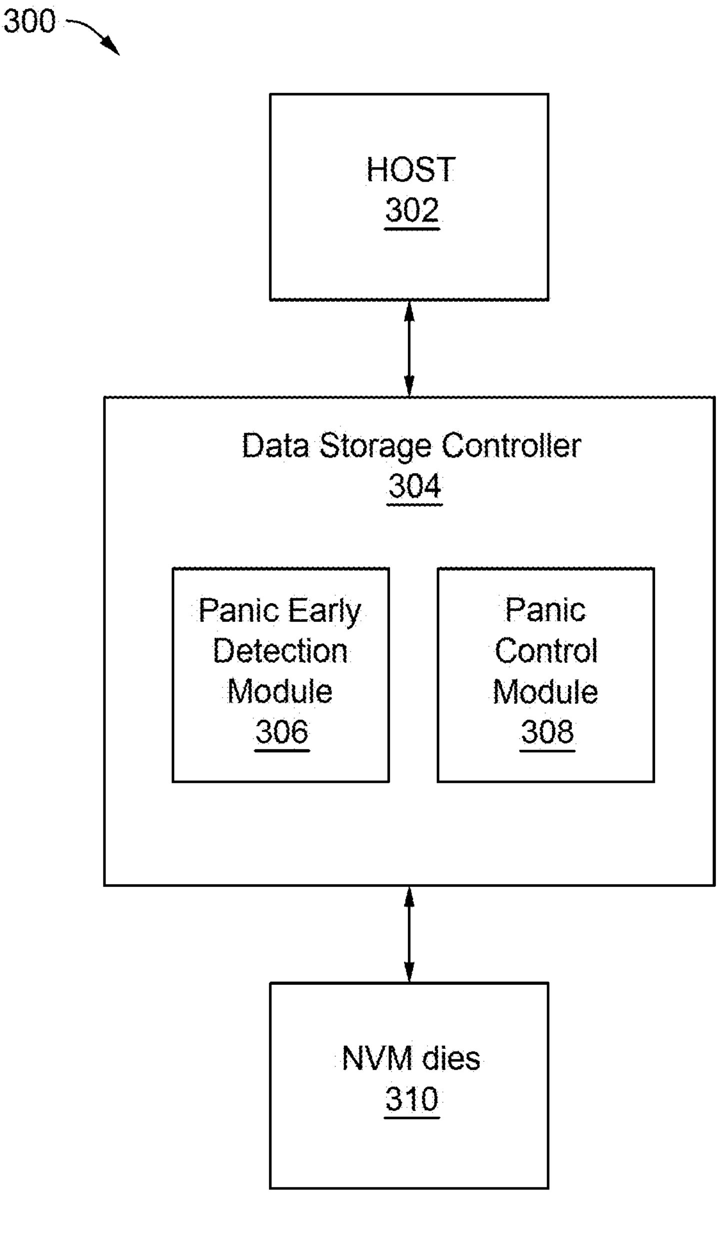
FIG. 3 is a schematic block diagram illustrating a storage system with early panic detection and control, according to some embodiments.

FIG. 3 is a schematic block diagram illustrating a storage system 300 with early panic detection and control, according to some embodiments. Storage system 300 comprises a host device 302, a data storage controller 304, and NVM dies 310. Host device 302 may be host 104 of FIG. 1. Data storage controller 304 may be controller 108 of FIG. 1. NVM dies 310 may be implemented in NVM 110 of FIG. 1. Data storage controller 304 comprises a panic early detection module (PDM) 306 and a panic control module (PCM) 308.

The PDM 306 is configured to detect a panic situation. The goal is to detect a future panic situation as early as possible. As a result, some false alarm rate is assumed by the system in case the system detects a future panic situation, but the panic situation is averted. The PCM 308 is configured to provide the host device 302 with several mitigation options to modify the storage system behavior once the PDM 306 detects a future device panic condition, depending on the panic ID (e.g., error type injection of FIG. 4).

FIG. 4 is a table 400 illustrating various potential error injections types for debugging panic situations of a data storage device, according to some embodiments. Table 400 is taken from the OCP Datacenter Specification. The possible causes of device panic conditions may range from failure of firmware to failure of the NVM. The panic IDs and the associated causes are different on a case-to-case basis; examples of various potential error injection types for debugging are depicted in table 400. Thus, when the data storage device (e.g., the data storage device 304 of FIG. 3) detects a panic situation and determines a panic ID relating to the cause, the data storage device may map the panic situation, failure conditions of the panic situation, or the panic ID to the corresponding error injection type in table 400 for debug.

Device panic situation types such as hardware malfunction may come with a wide range of characteristics. Although detection of these characteristic by the data storage device may indicate that there is a potential panic situation, not all of the characteristics—or single characteristic alone—necessarily cause a panic situation or an assert. For example, when an error correction code (ECC) engine malfunctions, the malfunction may be detected early on via a PDM (e.g., PDM 306 of FIG. 3) by noticing a drop in performance or increased power draw. In this circumstance, there may be a choice presented to the host device. For example, without triggering a failure, the host device may elect to sustain a reduced read performance while using the same amount of power, or use more power but expect the same performance.

In another example, in the case of NAND corruption, one of the dies may not be written to. This can be detected early on if, via monitoring, the number of cycles that it takes to write is abnormally high. In these circumstances, the system would likely evacuate all the data to other dies. However, this presents a tradeoff to the host device. The host device may experience reduced write performance, but can still read from the storage device with some reduced reliability, until the defected die is eventually unreadable. Or, the host device may also provide the data storage device with time slots to perform management operations, such as evacuation and management operations and attempts to revive the die for write commands. After this duration, the host device may eliminate the reduced reliability issues and only the reduced write performance would remain in situations where the die was not successfully revived.

In yet another example, in some cases, part of the DRAM may be suspected as corrupt. As a result, the DRAM may use some dedicated ECC and as soon as an issue is noticed the storage device may indicate an early panic situation flag (i.e., before there is an actual witnessing of corruption). Once the size of the corrupted DRAM is determined, the controller (e.g., controller 108 of FIG. 1) may propose reducing performance or the exported capacity, so that the controller has less data to "control" with the remaining DRAM. The controller may also suggest disabling features that rely on DRAM, or use most of the host device's DRAM (e.g., host device's HMB, such as HMB 150 of FIG. 1) where available. Alternatively, the controller may also decide to increase the ECC bits while working with DRAM to increase integrity. In some embodiments, the choices by the data storage device should be conveyed to the controller through the same interface within a timeframe, otherwise the data storage device will choose a default option to mitigate the detected early on panic condition.

Figure 5:
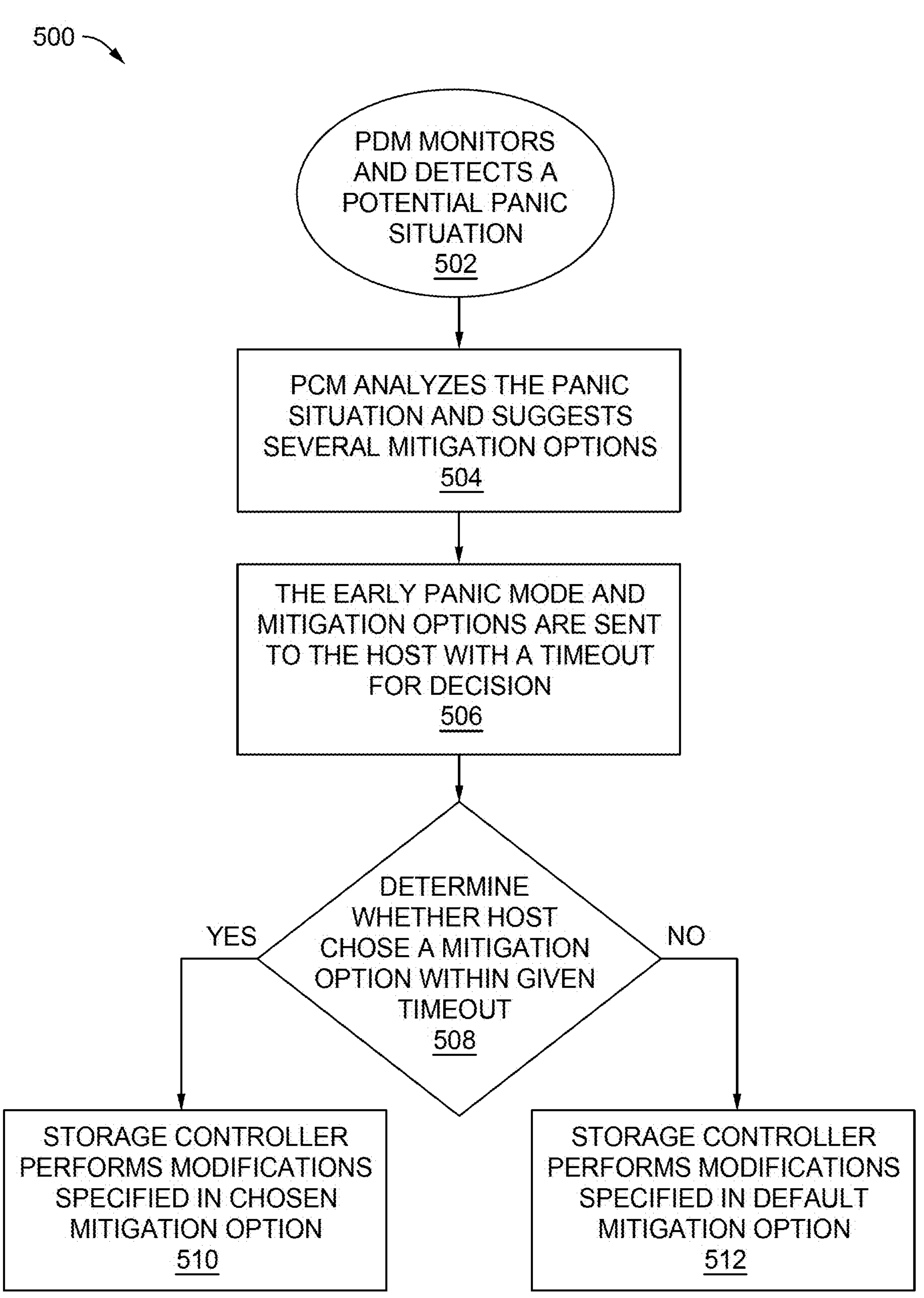
FIG. 5 is a flowchart illustrating a method of panic situation detection and mitigation of a data storage device, according to some embodiments.

FIG. 5 is a flowchart illustrating a method 500 of panic situation detection and mitigation of a data storage device, according to some embodiments. Method 500 starts at operation 502, where a PDM (e.g., PDM 306 of FIG. 3) of a controller (e.g., controller 108 of FIG. 108) monitors and detects a potential panic situation before the panic situation occurs. At operation 504, the PCM (e.g., PCM 308 of FIG. 3) analyzes the panic situation and suggests several mitigation options for the panic situation, such as the mitigation options discussed above. At operation 506, the early panic situation (e.g., the cause of the panic situation and other information about the panic situation) and mitigation options are sent to the host device with a timeout for the host device to make a decision. At operation 508, the data storage device determines whether the host device decided on mitigation options within the given timeout. If the host device decided on a mitigation option within the given timeout by notifying the controller of the chosen mitigation, then at operation 510, the controller performs the modifications specified by the chosen mitigation option. If the mitigation options sent to the host device times out and the host device has not chosen a mitigation option, then at operation 512, the controller performs modifications specified by a default mitigation option.

Figure 6:
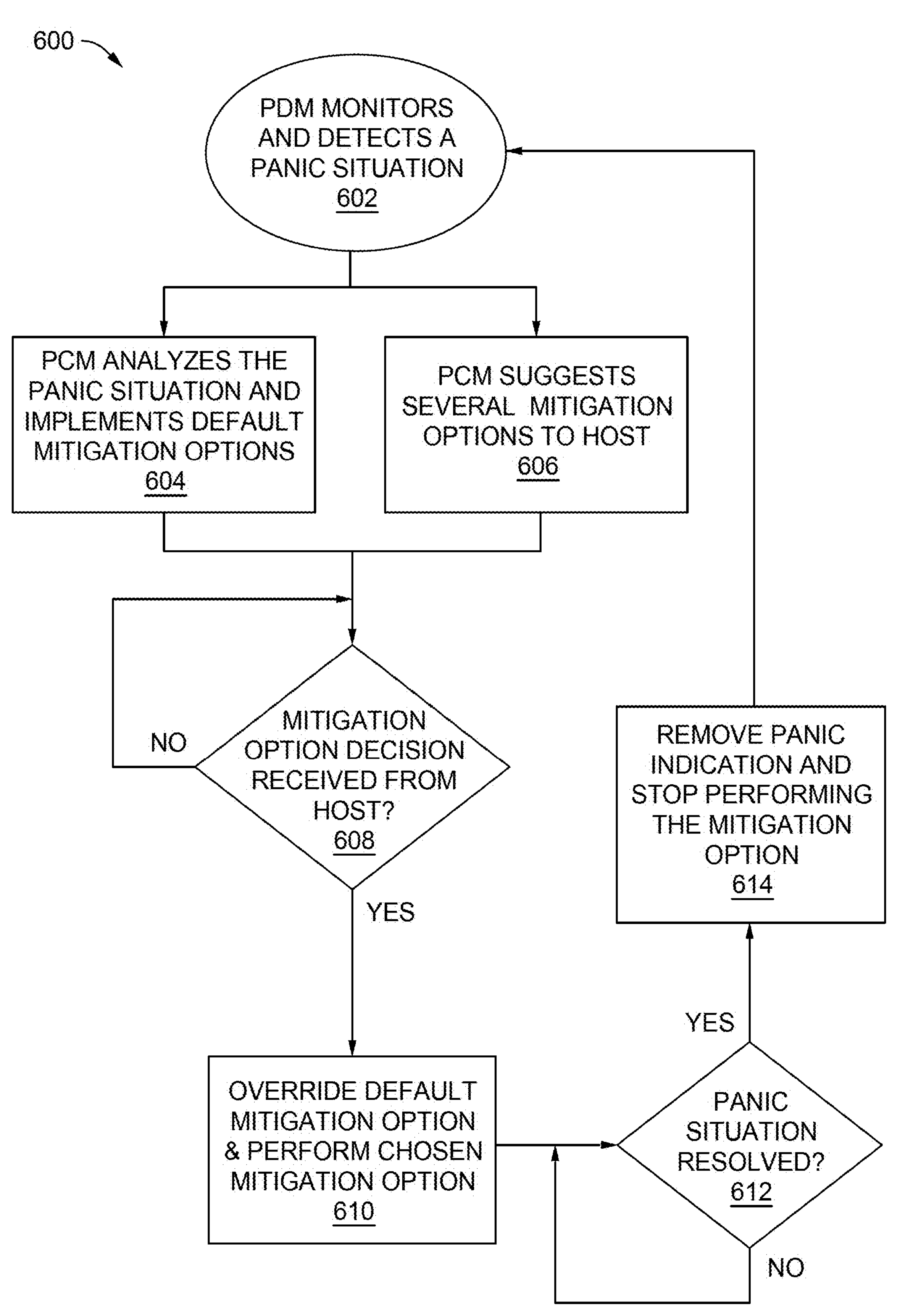
FIG. 6 is a flowchart illustrating a method of panic situation detection and mitigation of a data storage device, according to some embodiments.

FIG. 6 is a flowchart illustrating a method 600 of panic situation detection and mitigation of a data storage device, according to some embodiments. In some embodiments, when a PDM (e.g., PDM 306 of FIG. 3) detects a potential panic situation before the panic situation occurs and a PCM (e.g., PCM 308 of FIG. 3) analyzes the available and appropriate mitigation options for the detected panic situation, the controller (e.g., controller 108 of FIG. 108) may immediately switch to a default mitigation option out of the several appropriate mitigation options. In parallel, the appropriate mitigation options are also sent and posted to the host device, where the host device will be able to override the implemented default mitigation option by choosing a mitigation option. As a result, the data storage device is not exposed to more failures during the time the host is choosing a mitigation option, which in turn promotes device health. In some embodiments, the panic situation may be temporary and the controller manages to resolve the panic situation. In these circumstances, the controller may use the interface (e.g., interface 114 of FIG. 1) to remove the panic indicator (which may sometimes require a reset and post-reset operations), and remove the system limitation imposed by the chosen mitigation option.

Method 600 starts at operation 602, wherein a PDM of a controller monitors and detects a potential panic situation before the panic situation occurs. At operation 604, the PCM analyzes the panic situation and implements a default mitigation option for the panic situation, such as the mitigation options discussed above. In parallel with operation 604, at operation 606, the PCM suggests several mitigation options to the host device. At operation 608, the controller determines whether a mitigation option decision was received from the host device. If the controller determines that the host device has not chosen a mitigation option, then the controller will continue to wait for the host device to choose a mitigation option. If the controller determines that the host device has chosen a mitigation option, then at operation 610, the controller overrides the default mitigation option and instead performs the mitigation option chosen by the host device. At operation 612, the controller determines whether the panic situation is resolved. If the panic situation is not resolved, then the controller will wait until the panic situation is resolved before proceeding to operation 614. At operation 614, once the panic situation is resolved then the controller removes the panic indication and stops performing the mitigation operations before returning to operation 602.

Figure 7A:
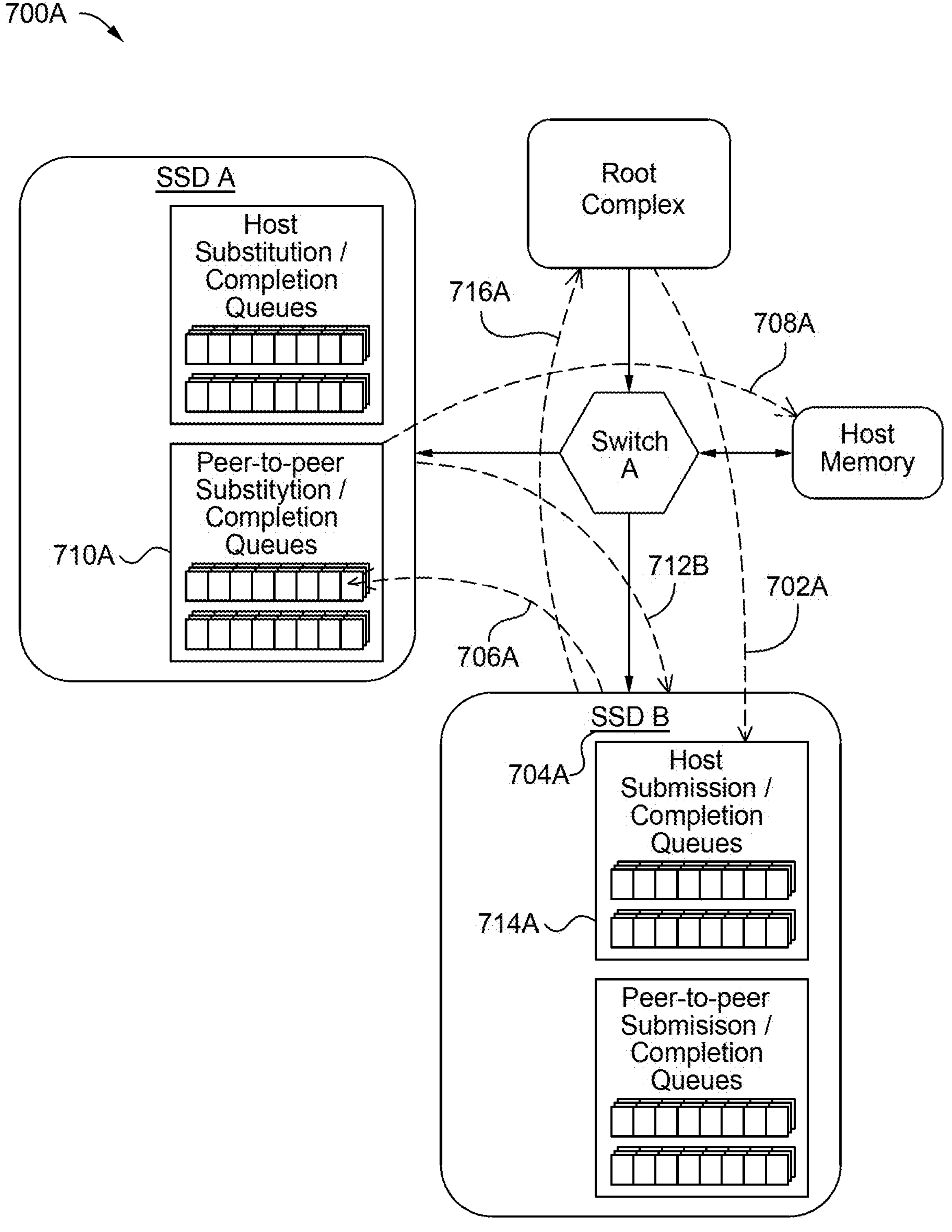
FIG. 7A is a schematic block diagram illustrating a storage system for detecting and mitigating future panic situations, according to some embodiments.

FIG. 7A is a schematic block diagram illustrating a storage system 700A for detecting and mitigating future panic situations, according to some embodiments. FIG. 7B is a flowchart illustrating a method 700B of panic situation detection and mitigation of the storage device of FIG. 7A. FIG. 7A is to be read in conjunction with FIG. 7B, since the steps of FIG. 7A correspond to the operations of method 700B of FIG. 7B. For example, operation 702B of FIG. 7B is associated with step 702A of FIG. 7A and so on.

Storage system 700A comprises a first SSD (e.g., SSD B), a second SSD (e.g., SSD A), an optional switch, a root complex, and a host memory (e.g., HMB 150 of FIG. 1). In some embodiments, one of the mitigation options may be peer 2 peer (P2P) early panic situation handling. Data storage device (e.g., a SSD) content in some datacenters is typically sharded or duplicated. The failure (or impending failure) of data storage devices can lead the host device to redirect input and output (I/O) to another data storage device. Thus, performance of the storage system may be maintained despite the failure or reduced performance of another storage device in the system by adding a status code or other indicator that points to a secondary location for the requested data.

However, in some embodiments, if the secondary location is in the same PCIe tree and is reachable, then a primary data storage device may redirect the command to another data storage device with PRPs/SGLs that point back to the same host device region. In some embodiments, the data storage devices may have a submission queue (SQ) between them. A first SSD (e.g., SSD B) may decide to take a command as is, queue that to a second SSD (e.g., SSD A), and ring the doorbell. The second SSD will execute the command and complete the command normally. This method is particularly beneficial to devices that do not use interrupts like GPUs as those cannot currently be moved.

Method 700B starts at operation 702B, where the host queues a command in a first data storage device (e.g., SSD B). At operation 704B, the first data storage device detects a potential panic situation before the panic situation occurs, and that another data storage device (e.g., SSD A) can perform the requested command. At operation 706B, the first data storage device queues a revised command in the P2P SQ of the another or second data storage device. At operation 708B, the second data storage device executes the command (e.g., data-transfer). At operation 710B, the second data storage device updates the relevant P2P completion queue (CQ) and optionally interrupts the first data storage queue. At operation 712B, the first data storage device parses the completion entry. At operation 714B, the first data storage device writes a completion entry to the relevant host CQ. At operation 716B, the first data storage device interrupts the host device. It is to be noted that in FIG. 7A, all SQs and CQs are illustrated in CMD mode but method 700B could be implemented in host memory.

By detecting panic situations and providing a host device detailed panic data and mitigation options before the panic situation condition occurs, failure of data storage devices may be reduced. Several mitigation options may be presented to the host device upon detection of a future panic situation, such as adjusting read performance; increasing device power; performing evacuation and management operations; and/or redirecting host commands to another data storage device for command completion. By redirecting host commands to another data storage device for command completion, the data storage system becomes more robust by being able to handle panic situations with minimal latency impact in a high-end market.

In one embodiment, a data storage device includes a memory device; and a controller coupled to the memory device, wherein the controller is configured to: detect a future panic situation of the data storage device; analyze the future panic situation; suggest at least one mitigation option to a host device, wherein the suggestion comprises a decision timeout; perform a default mitigation option while waiting to receive a selected mitigation option from the host device; receive from the host device a selected mitigation option selected from the suggested at least one mitigation options; and perform the selected mitigation option.

The controller is further configured to perform a default mitigation option based on the decision timeout. Receiving the selected mitigation option overrides the default mitigation option. The controller is not exposed to additional future panic situations while waiting to receive the selected mitigation option from the host device. The data storage device and second data storage device are peer-to-peer (P2P). A mitigation option of the at least one mitigation options redirects a host command received by the data storage device to a second data storage device. Redirecting the host command comprises: determining whether the second data storage device can perform the host command; and queuing the host command into a submission queue of the second data storage device. The submission queue of the second data storage device is a peer-to-peer (P2P) submission queue. Redirecting the host command further comprises: parsing a completion entry to a completion queue of the second data storage device; and writing a completion entry to a relevant host completion queue of the data storage device. The completion queue of the second data storage device is a peer-to-peer (P2P) completion queue. Redirecting the host command further comprises interrupting the host device after writing the completion entry to the relevant host completion queue.

In another embodiment, a data storage device includes a memory device; and a controller coupled to the memory device, wherein the controller is configured to: detect a future panic situation of the data storage device based on a panic indicator; analyze the future panic situation; suggest at least one mitigation option to a host device, wherein a mitigation option of the at least one mitigation options comprises redirecting a host command to another location; perform a mitigation option; and determine that the future panic situation is resolved.

The another location is a second data storage device. The second data storage device is in a same PCIe tree as the data storage device. The controller is further configured to remove the panic indication and stop performing the mitigation option after the future panic situation is resolved. The controller comprises a panic early detection module and a panic control module.

In yet another embodiment, a data storage device includes means to store data; and a controller coupled to the means to store data, wherein the controller is configured to: detect a future panic situation of the data storage device; receive a host command queued in a submission queue of a host device; redirect the host command to a second data storage device for completion, wherein the second data storage device is in a same PCIe tree as the data storage device; and interrupt the host with a completion entry to a relevant host completion queue of the host device.

The controller is further configured to redirect the host command to the second data storage device with physical region pages (PRPs) that point back to a same host region. The controller is further configured to redirect the host command to the second data storage device with scatter gather lists (SGLs) that point back to a same host region. The controller is further configured to add an indicator that points to another location when the host command is received.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
detect a future panic situation of the data storage device;
analyze the future panic situation;
suggest at least one mitigation option to a host device, wherein the suggestion comprises a decision timeout;
perform a default mitigation option while waiting to receive a selected mitigation option from the host device;
receive from the host device the selected mitigation option selected from the suggested at least one mitigation options; and
perform the selected mitigation option.

2. The data storage device of claim 1, wherein the controller is further configured to perform the selected mitigation option based on the decision timeout.

3. The data storage device of claim 1, wherein receiving the selected mitigation option overrides the default mitigation option.

4. The data storage device of claim 3, wherein the controller is not exposed to additional future panic situations while waiting to receive the selected mitigation option from the host device.

5. The data storage device of claim 1, wherein a mitigation option of the at least one mitigation options redirects a host command received by the data storage device to a second data storage device.

6. The data storage device of claim 5, wherein the data storage device and second data storage device are peer-to-peer (P2P).

7. The data storage device of claim 5, wherein redirecting the host command comprises:
determining whether the second data storage device can perform the host command; and
queuing the host command into a submission queue of the second data storage device.

8. The data storage device of claim 7, wherein the submission queue of the second data storage device is a peer-to-peer (P2P) submission queue.

9. The data storage device of claim 7, wherein redirecting the host command further comprises:
parsing a completion entry of a completion queue of the second data storage device; and
writing a completion entry to a relevant host completion queue of the data storage device.

10. The data storage device of claim 9, wherein the completion queue of the second data storage device is a peer-to-peer (P2P) completion queue.

11. The data storage device of claim 9, wherein redirecting the host command further comprises interrupting the host device after writing the completion entry to the relevant host completion queue.

12. A data storage device, comprising:
a memory device; and
a controller coupled to the memory device, wherein the controller is configured to:
detect a future panic situation of the data storage device based on a panic indicator;
analyze the future panic situation;
suggest at least one mitigation option to a host device, wherein a mitigation option of the at least one mitigation options comprises redirecting a host command to another location, wherein the another location is a second data storage device;
perform a mitigation option;
queue a revised command in a submission queue (SQ) of the second data storage device; and
determine that the future panic situation is resolved.

13. The data storage device of claim 12, wherein the second data storage device is in a same PCIe tree as the data storage device.

14. The data storage device of claim 12, wherein the controller is further configured to remove the panic indicator and stop performing the mitigation option after the future panic situation is resolved.

15. The data storage device of claim 12, wherein the controller comprises a panic early detection module and a panic control module.

16. A data storage device, comprising:
means to store data; and
a controller coupled to the means to store data, wherein the controller is configured to:
detect a future panic situation of the data storage device;
receive a host command queued in a submission queue of a host device;
redirect the host command to a second data storage device for completion, wherein the second data storage device is in a same PCIe tree as the data storage device; and interrupt the host with a completion entry to a relevant host completion queue of the host device.

17. The data storage device of claim 16, wherein the controller is further configured to redirect the host command to the second data storage device with physical region pages (PRPs) that point back to a same host region.

18. The data storage device of claim 16, wherein the controller is further configured to redirect the host command to the second data storage device with scatter gather lists (SGLs) that point back to a same host region.

19. The data storage device of claim 16, wherein the controller is further configured to add an indicator that points to another location when the host command is received.

* * * * *